United States Patent [19]
Moss, Jr. et al.

[11] 3,741,015
[45] June 26, 1973

[54] PRECISION PRESSURE GAUGE

[75] Inventors: Kennard S. Moss, Jr.; Weldon R. Hicks, both of Houston, Tex.

[73] Assignee: Texas Instruments Incorporated, Dallas, Tex.

[22] Filed: Mar. 1, 1971

[21] Appl. No.: 119,972

[52] U.S. Cl. .................... 73/393, 73/398 R, 73/418
[51] Int. Cl. ......................... G01l 19/04, G01l 7/04
[58] Field of Search ...................... 73/418, 398, 393, 73/386, 411

[56] References Cited
UNITED STATES PATENTS
3,301,062   1/1967   Reesby et al. ......................... 73/393
3,286,529   11/1966   Damrel, Jr. et al. ............... 73/398 R Primary Examiner—Donald O. Woodiel
Attorney—James O. Dixon, Andrew M. Hassell, Harold Levine, Melvin Sharp, Rene E. Grossman and James T. Comvort

[57] ABSTRACT

A precision pressure gauge including Bourdon tube has a direct linear relation between applied pressure and Bourdon tube angle of deflection. An electrical circuit applies a continuously adjusted offset current to a transducer in order to apply the appropriate correction at any point on the Bourdon tube error curve.

1 Claim, 4 Drawing Figures

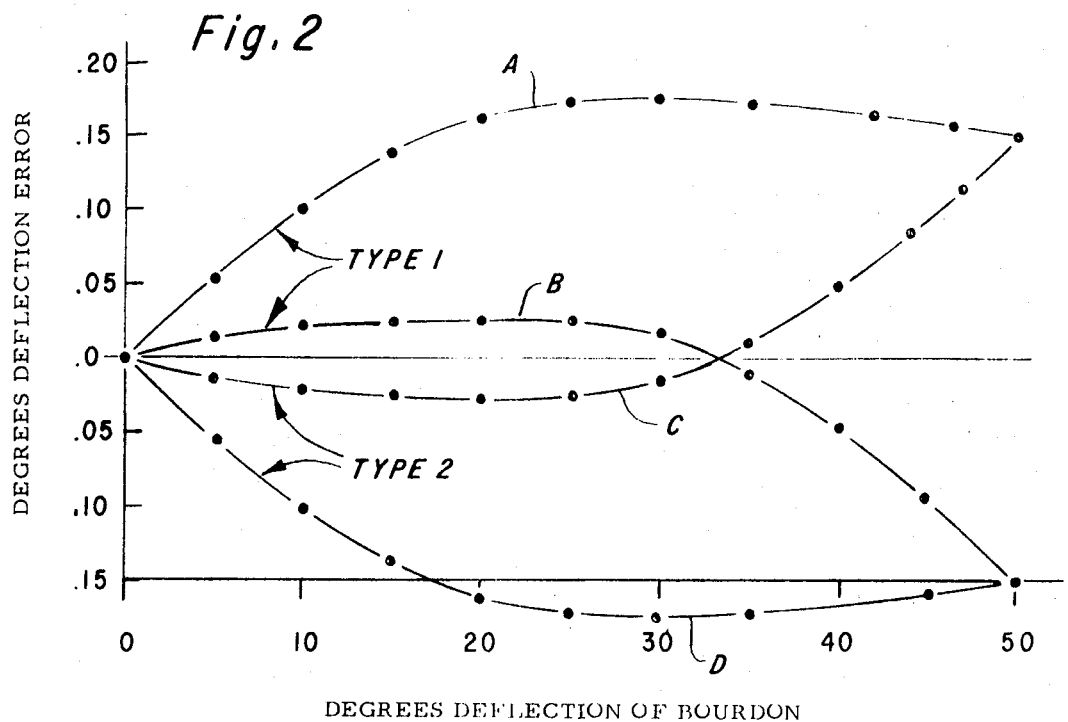
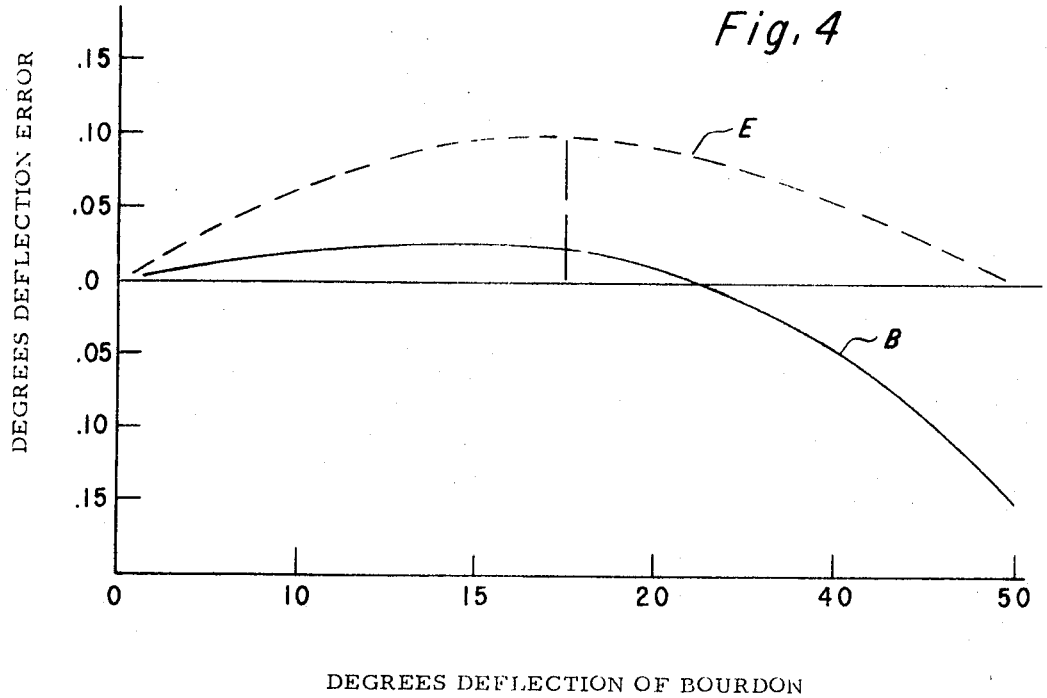

PRECISION PRESSURE GAUGE

This invention is directed to a precision pressure gauge for use either in measurement or control of pressure or any other parameters which can be converted to pressure.

Measurement of pressure or physical conditions which can be converted to pressure or can be made pressure-dependent has been accomplished through a variety of instrumentalities using Bourdon tubes which are responsive to pressure differentials across the walls thereof to undergo deformation.

A pressure gauge includes a helical pressure tube fixedly supported at one end thereof. A mirror is mounted at the axis of the tube for rotation and response to variations in the pressure differential across the walls thereof. A light source directs a beam of light onto the mirror. A detector is mounted for detecting the beam after deflection from the mirror. The detector may be rotated about the axis of the tube.

A hollow fused quartz helical spring has a fixed support from one end thereof and a mirror mounted at the axis thereof at a second point spaced from the fixed end. The light sensitive devices may be sensed.

Due to manufacturing tolerances and the nonlinear spring rate of the quartz, hermetical Bourdon helix, there is an error factor between the applied pressure and the displayed angle of deflection of a Bourdon tube.

The deflection rate may vary with deflection of the fused-quartz Bourdon tube.

It is therefore an object of this invention to provide a new and improved correction in the nonlinear rotation of a Bourdon tube with applied pressure.

It is another object of this invention to provide a new improved pressure gauge having a linear and direct relation between applied pressure and displaced angle of deflection of a Bourdon tube in the pressure gauge.

Other objects and advantages will become apparent from the following detailed description in conjunction with the accompanying drawings, in which:

FIG. 2 is a graphical illustration of nonlinear error curves for typical Bourdon tubes;

FIG. 4 is a graphical illustration of mid-span error in a Bourdon tube error curve.

Figure 1:
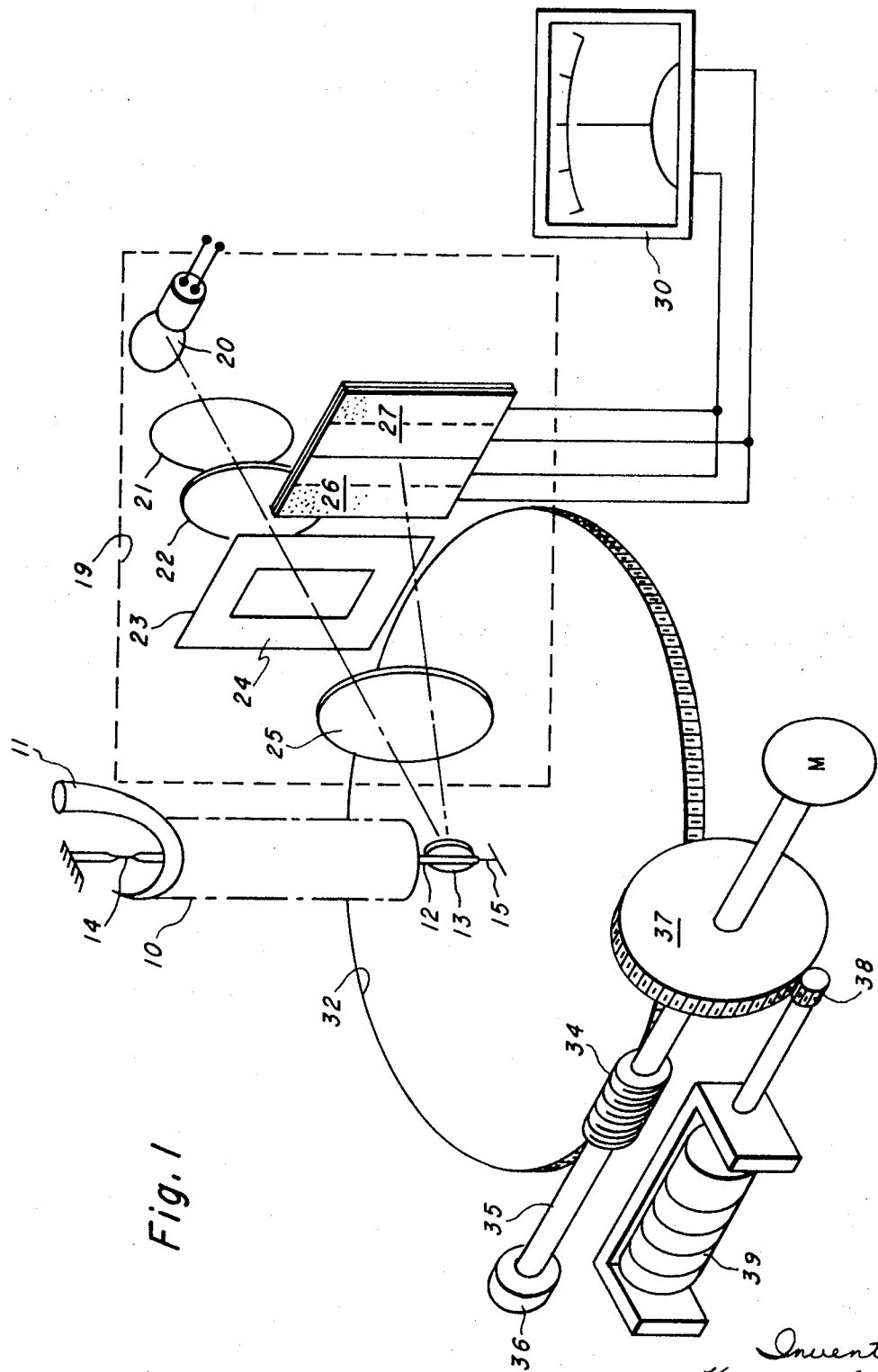
FIG. 1 is a schematic view of a Bourdon tube pressure gauge of the type employed in the present invention, without the nonlinear correction means of the invention.

Referring now to FIG. 1, a pressure gauge using a Bourdon tube is shown diagrammatically. A spiral-shaped, thin-walled fused quartz spring 10 is anchored at the upper end 11. The spring 10 is a hollow tube. The upper end 11 is to be flow-connected by a suitable pressure fitting, through the wall of a case or housing, omitted from FIG. 1. The lower end of the spring 10 is closed and is fastened to a central stabilizing rod 12. A mirror 13 is mounted on rod 12. Rod 12 is anchored by way of an upper hinge 14 and a lower hinge 15. Rod 12, also made of fused quartz, has hinges 14 and 15 formed therein while under tension by application of localized heat to draw the rod down to a filament of reduced diameter which permits rotation of the portion of rod 12 between hinges 14 and 15. When spring 10 is mounted in this manner, variations in the pressure differential across the walls of the spring 10 will cause the mirror 13 to rotate.

The deflection of the mirror preferably is read optically through use of a transducer 19. The transducer 19 includes a light source 20, a condensing lens unit including the lenses 21 and 22, and a baffle 23 having an aperture 24 therein. Light emanating from the aperture 24 passes through an objective lens 25 to the mirror 13 and back to the objective lens which focuses the image of the aperture 24 onto two light sensitive cells 26 and 27. The cells 26 and 27 preferably are photovoltaic silicon cells which are matched for sensitivity and temperature characteristics. They are connected together in series aiding relationship and to a null indicator 30. The null indicator may be a microammeter selected as to have a sensitivity consistent with the outputs of lamp 20 and the cells 26 and 27.

The transducer 19 is mounted on the upper face of a large worm gear or disc 32. The disc 32 is mounted for rotation about the axis of spring 10. The position of the transducer 19 may be varied relative to the mirror 13 by actuation of a worm gear 34 which engages teeth on the periphery of the disc 32.

The worm 34 is mounted on a shaft 35 which has a control knob 36 at one end thereof for adjustment of the position of the transducer 19. A gear train including a gear 37 and a pinion 38 are employed for driving a counter 39.

In operation, the end 11 of the spring 10 may be connected to a source the pressure of which is to be measured or controlled. Lamp 20 is then energized. If the areas of the image of the aperture 24 as focused onto cells 26 and 27 are equally divided between the cells 26 and 27, the output signal is zero as applied to the indicator 30 and the system is nulled. However, when the aperture image is displaced, due to pressure changes within the element 10 or manual rotation of the transducer, the transducer system may become unbalanced by reason of the difference in areas on cells 26 and 27 which are illuminated. The magnitude of the unbalance may be indicated by the null detector 30.

Detector 30, in the form of a microammeter, may be suitably calibrated to provide a direct indication of the pressure differential across the walls of the tube 10. When a pressure change takes place, the light of the cells 26 and 27 is displaced. The extent of rotation of the disc 32 necessary to null the transducer 19 is a function of the pressure change and a constant which is specific to each spring. With a fused quartz element for the spring 10, the signal is linear over relatively small angles, such as on the order of plus or minus 1.5 degrees, without nulling.

Due to manufacturing tolerances and the nonlinear spring rate of the quartz or metal Bourdon helix shown in FIG. 1, there is not a linear and direct relation between the applied pressure and the displayed angle of deflection of the Bourdon tube itself.

Referring now to FIG. 2, the deflection error may vary with the actual degree of deflection of the fused-quartz Bourdon tube 10 shown in FIG. 1. The curve shown in FIG. 2 is for two types of Bourdon tubes: type 1 being the differential tube and type 2 being the absolute tube. The degree of deflection of the Bourdon tube is shown from 0 to 50 degrees and the degree of error is shown as ranging from 0 to 0.20 degrees of error in a positive direction and 0 to 0.15 degrees of error in the negative direction. Type 1 Bourdon tube, which is the differential tube, is shown in curves A and B and the type 2 tube is shown in curves C and D. The pair of curves A and B represent typical manufacturing tolerances for type 1 tubes. Similarly, curves C and D represent typical manufacturing tolerances for type 2 tubes. For the type 1 differential Bourdon tube, it can be seen that the error ranges from 0 for a 0 degree deflection of the Bourdon tube in curve A to a maximum of 0.175 degree of error for a 25 degree deflection continuing on to a 0.15 degree of error for a 50 degree of deflection for the Bourdon tube. Curve B shows that the error starts at zero degree of error for zero degree of deflection for the type 1 differential tube and then after about 35 degrees of deflection for the Bourdon tube, rapidly drops off to a negative 0.15 degrees of deflection error for 50 degrees of deflection.

For the type 2 absolute Bourdon tube, curve C shows that the error starts rapidly after approximately 35 degrees of deflection for the Bourdon tube to a plus 0.15 degrees of deflection error for a 50 degree deflection of absolute Bourdon tube. Curve D shows that the error for the absolute Bourdon tube moves quickly to a −0.175 degree of deflection error at between 20 and 40 degrees of deflection of the absolute Bourdon tube.

The degree of deflection error shown in FIG. 2 is undesirable.

In the pressure gauge shown in FIG. 1, the angle of Bourdon deflection is displayed directly on a mechanical readout counter 39 when the photo-cell transducer 19 is rotated to exactly match the angle of the Bourdon tube deflection. The photo-cell output at this point is zero (null). Rotating the transducer 19 from this point will cause a plus or minus output from the photo-cells. The transducer and counter may be rotated manually or with a self-seeking servo-drive.

In order for the readout counter to indicate the true corrected pressure, the photo-cells must have a slight offset output current when the servo or manual null is at zero. Therefore, the correction current must be supplied to the nulling circuit to force the photo-cells to have the proper equal and opposite offset for any angle of deflection of the Bourdon tube in order that proper calibration may be maintained.

Referring now to FIG. 8, the photo-cell transducer 19 is connected through resistor 41 to ground and through resistor 43 to a summing point 45. Summing point 45 is connected through an operational amplifier 47 to a null meter 49. Summing point 45 is connected through resistor 53, variable resistor 55, resistor 57 to point 63. Point 63 may be connected to point 62 or 64 to provide proper shape to the correction curve in the manner to be described and point 61 may be connected to point 62 or 64 to provide proper polarity for full scale correction. The readout counter 39 through the pinion gear 38 is connected to a servo motor 67. Summing point 45 is connected through an adjustable resistor 71 to servo amplifier 69 which has its output applied to servo motor 67 to provide a control signal for servo motor 67. Servo motor 67 drives an angular correction potentiometer 73 with the angular correction potentiometer 73 geared to the servo motor 67 so that there is a full pressure span between the two terminals 75 and 77 of the potentiometer 73.

Terminal 77 of the angular correction potentiometer 73 is connected to a slider 79 on potentiometer 81. Terminal 75 of angular correction potentiometer 73 is connected to ground. Potentiometer 81 is connected between ground and resistor 83 to point 61. Point 64 is connected to a negative voltage supply and point 62 is connected to a positive voltage supply.

Potentiometer 81 is provided for full span calibration. Resistor or potentiometer 55 is provided for midspan calibration. Angular correction potentiometer 73 may have extra taps between tap 75 and 77 to adjust the potentiometer for the proper linearity if needed.

The angular correction potentiometer 73 may be adjusted so that the slider 76 is exactly over tap 75 when the readout counter 39 is at 000.000 and the applied pressure is 0. At this adjustment, there is a zero correction voltage.

When the readout counter 39 is at full scale, the slider 76 of potentiometer 73 will be at terminal 77. Assuming no voltage at voltage point 63, voltage developed across variable resistor 81 is a correction voltage for full span correction. On the particular circuit shown, assuming +2.3 volts at point 62 and −2.3 volts at point 64, the voltage at full scale deflection will be from 0 to 0.469 volts. This voltage may be either plus or minus depending on the connection at voltage point 61, i.e., whether point 61 is connected to point 62 or to point 64. From the following equation $$e_p = -e_c \ (R2/R4) \qquad 1.$$

where $e_p$ = photo cell output voltage across resistor 41 and $e_c$ = correction voltage at slider 76 of angular correction pot 73.

With the photo cell sensitivity of 0.300 volts/degree, then, $$e_p \ (\text{max}) = 0.469 \ (3K/30K) = 0.0469 \text{ volts} \qquad 2.$$

Max. deflection correction = (0.0469 volts/0.300 v/o)
$$= 0.157° \qquad 3.$$

From FIG. 2, it can be seen that a maximum correction of only 0.150° is needed at full span for the quartz Bourdon tube.

FIG. 4 shows a typical mid-span correct needed to linearize the Bourdon tube deflection. Assuming that the full span error has been reduced to 0 with resistor 81, the mid-span error that remains will be approximately 0.010° to 0.120° for quartz Bourdon tubes. Curve B is the same as Curve B of FIG. 2. Curve E represents curve B after correction for full span error.

By connecting voltage point 63 to voltage points 62 or 64, a current ($i_n$) will flow into the angular correction potentiometer slider 76. Since both ends of this potentiometer are at or near ground potential, the maximum voltage across the potentiometer due to ($i_n$) will be at the center of the span. With the slider of resistor 81 to ground, the equivalent mid-span resistance of angular correction potentiometer 73 to ground will be 5K. Therefore, the correction voltage ($e_c$) developed in mid-span due to ($i_n$) will be $$e_c = \frac{2.3 \text{ volts } \frac{(30K)(5K)}{30K+5K}}{(R5+R6) + \frac{(30K)(5K)}{30K+5K}} \qquad 4.$$

$$ec = \frac{2.3(4.29K)}{(R_5+R_6)+4.29K} \qquad 5.$$

$$(R_5+R_6) = \frac{2.3(4.29K)}{e_c} - 4.29 \qquad 6.$$

For 0.120° error correction:

$$e_c = 10(0.300 \text{ V}/1°)(0.120°) = 0.360 \text{ volts}$$

7.

$$(R5+R6) = (9.86K/0.360) - 4.29K = 23.11K$$

8.

For 0.010° error correction:

$$e_c = 10(0.300)(0.010) = 0.030 \text{ volts}$$

9.

$$R5+R6 = (9.86K/0.030) - 4.29K = 324.2K$$

10.

Correction voltage ($e_c$) is the sum of the voltage due to ($i_n$) and the voltage developed at potentiometer 81. These voltages add or subtract depending on the polarity correction of each. The angular correction potentiometer 73 connected in this manner in this circuit nearly exactly matches the characteristic curve of fused quartz Bourdon tubes, and may be used to correct for positive or reverse wound tubes and also allow for normal production strength tolerances.

By adding extra taps if needed to the angular correction potentiometer 73, or using a nonlinear taper, the circuit can operate properly for any Bourdon tube, glass or metal. For the standard fused quartz tubes, a linear pot is used. The maximum amount of correction required in this circuit is about 0.200° out of 50° and in order to assure a correction linearity of 0.001° or better, the potentiometer linearity must be (0.001 (100)/0.200) = 0.5 percent or better.

Figure 3:
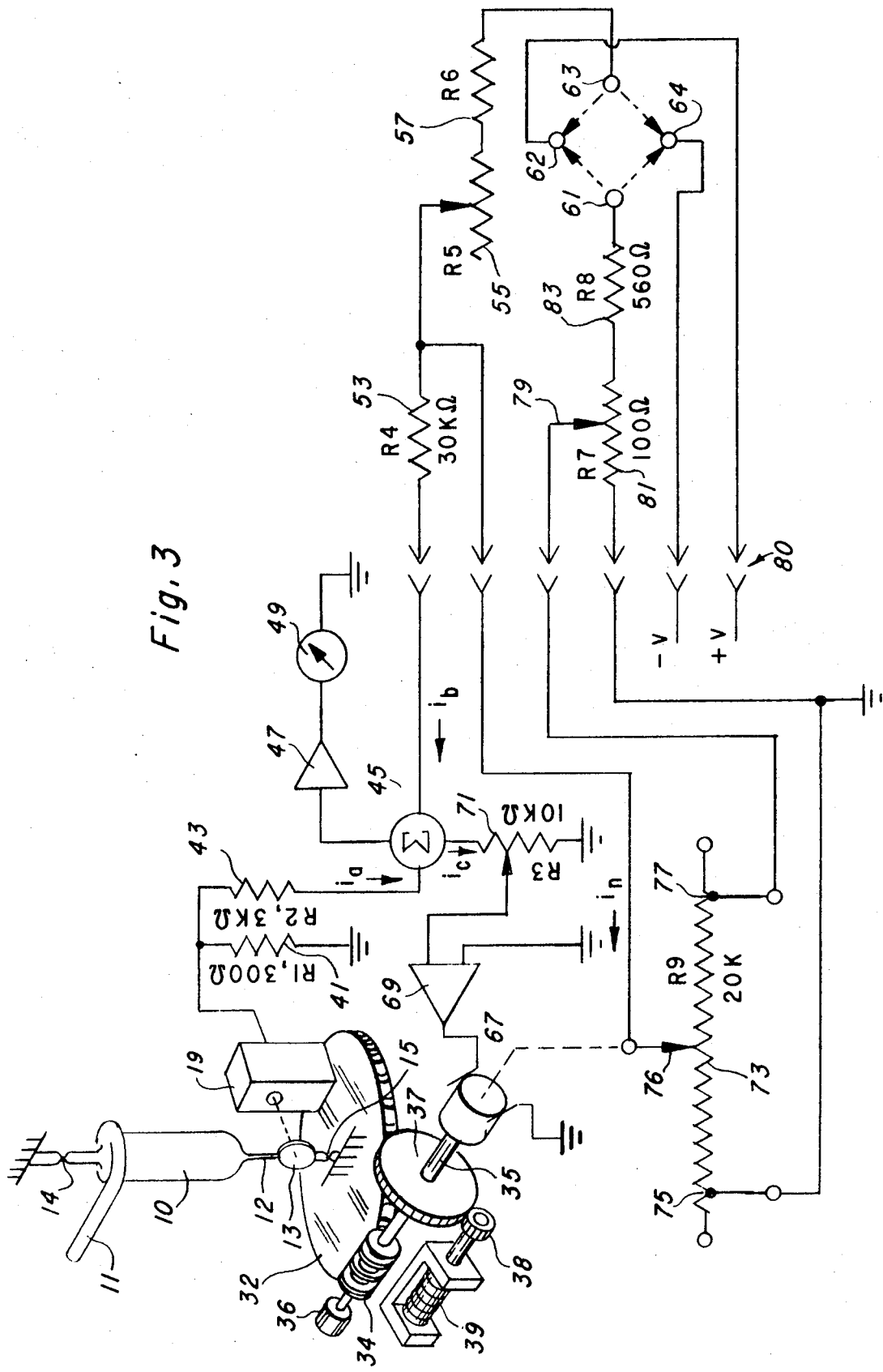
FIG. 3 is a schematic view of the pressure gauge of the invention.

In operation, if currents $i_a$ and $i_b$ in FIG. 3 are exactly equal in magnitude and opposite in polarity, null meter 49 will read 0 deflection and current $i_c$ will be zero. If $i_a$ and $i_b$ do not exactly cancel, null meter 49 will register a deflection and net current $i_c$ is applied through potentiometer 71 and amplifier 69 as a control signal to servo 67. In response to this control signal servo 67 rotates shaft 35, thus rotating the position of transducer 19 and changing current $i_a$. At the same time servo 67 moves wiper 76 on potentiometer 73, thus causing a change in current $i_b$. At equilibrium, offset current $i_a$ exactly cancels correction current $i_b$ and readout counter 39 reads a true indication of applied pressure, free of the nonlinear errors previously discussed herein. Correction to 0.001° can readily be obtained.

The principle of direct readout correction described herein can be applied to any first order transducer function which has mechanical motion as a part of its readout. It is easy to calibrate and set to zero. It does not involve extensive machining and can be easily recalibrated or changed for more than one Bourdon tube. For example, the resistive network connected to the pressure gauge at connectors 80 in FIG. 3 may be disconnected and another resistive network having different resistive values, particularly R5 and R7 preadjusted, may be connected so as to match the characteristic non-linear error curve of a different Bourdon tube.

It should be noted that the principle of the invention is not limited to the rotatable light source and detector disclosed. For example, either the source or the detector may be rotatably mounted and the other fixed. And in a system which includes means for restoring the position of the deflected mirror, both source and detector may be fixed.

The disclosed embodiment is to be interpreted only as an illustration of the features of the invention and not as a limitation thereon.

What is claimed is:

1. A pressure gauge which comprises:
   a. a hollow helical tube supported with one end thereof fixed and the other end moveable;
   b. a mirror mounted at the other end of said tube and at the axis thereof for rotation relative to said axis and dependent upon the movement at said other end of said tube;
   c. structure for establishing a pressure differential across the walls of said tube to move said other end;
   d. a sensing means for directing a beam of light onto said mirror and including light sensitive means for detecting the reflected light and producing an electrical current $i_1$ in response thereto;
   e. circuit means for producing a correction current $i_2$;
   f. summing means coupled to current $i_1$ and $i_2$ for producing a sum current $i_3$;
   g. control means responsive to current $i_3$ for adjusting currents $i_1$ and $i_2$ until $i_3 = 0$, said control means comprising a servo motor coupled to rotate said sensing means, thereby changing the angle of incidence of the reflected light and thus changing current $i_1$;
   h. said circuit means comprising an adjustable resistor having a wiper coupled to said servo motor, a second adjustable resistor for off-setting an error at a maximal pressure state and a third adjustable resistor for offsetting an error at a medial pressure state.

* * * * *